US007072673B2

(12) United States Patent
Tsunehara et al.

(10) Patent No.: US 7,072,673 B2
(45) Date of Patent: *Jul. 4, 2006

(54) RADIO HANDSET AND POSITION LOCATION SYSTEM

(75) Inventors: Katsuhiko Tsunehara, Hachioji (JP); Kenzaburo Fujishima, Kokubunji (JP); Mikio Kuwahara, Hachioji (JP); Koji Watanabe, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 449 days.

This patent is subject to a terminal disclaimer.

(21) Appl. No.: 10/274,970

(22) Filed: Oct. 22, 2002

(65) Prior Publication Data

US 2003/0050079 A1 Mar. 13, 2003

Related U.S. Application Data

(63) Continuation of application No. 09/940,548, filed on Aug. 29, 2001, now Pat. No. 6,484,034.

(30) Foreign Application Priority Data

Jul. 24, 2001 (JP) .............................. 2001-222533

(51) Int. Cl.
*H04Q 7/20* (2006.01)
(52) U.S. Cl. ................. 455/456.6; 455/457; 455/456.5; 370/333; 370/334; 342/357.01; 342/357.08
(58) Field of Classification Search ............. 455/456.5, 455/456.6, 456.1, 457, 425, 424; 370/335, 370/342, 343, 491, 331, 333, 334; 342/457, 342/463, 357.01, 357.08

See application file for complete search history.

(56) References Cited

U.S. PATENT DOCUMENTS

| 4,547,777 | A | | 10/1985 | Lamiraux |
| 4,670,759 | A | | 6/1987 | Fukuhara |
| 5,602,903 | A | | 2/1997 | LeBlanc et al. |
| 5,796,366 | A | | 8/1998 | Grebnev et al. |
| 5,912,644 | A | * | 6/1999 | Wang .......................... 342/457 |
| 5,953,326 | A | * | 9/1999 | Nakamura et al. .......... 370/335 |
| 6,006,067 | A | | 12/1999 | Rudowicz |

(Continued)

FOREIGN PATENT DOCUMENTS

AU 80938/75 5/1975

(Continued)

OTHER PUBLICATIONS

European Search Report dated Nov. 11, 2003.

*Primary Examiner*—Danh Cong Le
(74) *Attorney, Agent, or Firm*—Reed Smith LLP; Stanley P. Fisher, Esq.; Juan Carlos A. Marquez, Esq.

(57) ABSTRACT

A radio handset includes: a signal receiver for receiving signals from a plurality of radio stations; a reception timing analyzer for analyzing reception timings of signals received by the signal reception means; a radio station selector for selecting radio stations to be used in a position calculation; and a position calculator for calculating a position of a signal reception point by using the reception timings of the signals from the selected radio stations. The radio station selector selects the radio stations to be used in the position calculation in such a manner that when reception timings of signals from two or more of the radio stations cannot be separated from one another, it is decided to exclude a signal from at least one of these radio stations.

15 Claims, 8 Drawing Sheets

U.S. PATENT DOCUMENTS

| | | |
|---|---|---|
| 6,052,561 A | 4/2000 | Rudowicz et al. |
| 6,195,343 B1 * | 2/2001 | Watanabe ................... 370/335 |
| 6,201,803 B1 | 3/2001 | Munday et al. |
| 6,211,819 B1 | 4/2001 | King et al. |
| 6,310,576 B1 | 10/2001 | Johnson |
| 6,347,228 B1 | 2/2002 | Ludden et al. |
| 6,721,561 B1 * | 4/2004 | Jeong et al. ................. 455/433 |
| 6,765,895 B1 * | 7/2004 | Watanabe ................... 370/335 |
| 6,845,239 B1 * | 1/2005 | Sato et al. ............... 455/456.1 |
| 2001/0021179 A1 * | 9/2001 | Tiedemann et al. ......... 370/333 |
| 2001/0034238 A1 | 10/2001 | Voyer |
| 2002/0002036 A1 | 1/2002 | Uchara et al. |
| 2002/0004398 A1 * | 1/2002 | Ogino et al. ................. 455/456 |
| 2002/0122396 A1 * | 9/2002 | Terasawa .................... 370/331 |
| 2003/0054768 A1 * | 3/2003 | Challa et al. .................. 455/63 |

FOREIGN PATENT DOCUMENTS

| | | |
|---|---|---|
| EP | 0 964 265 A2 | 5/1999 |
| JP | 7-181242 | 12/1993 |
| JP | 2000-75012 | 9/1998 |

\* cited by examiner

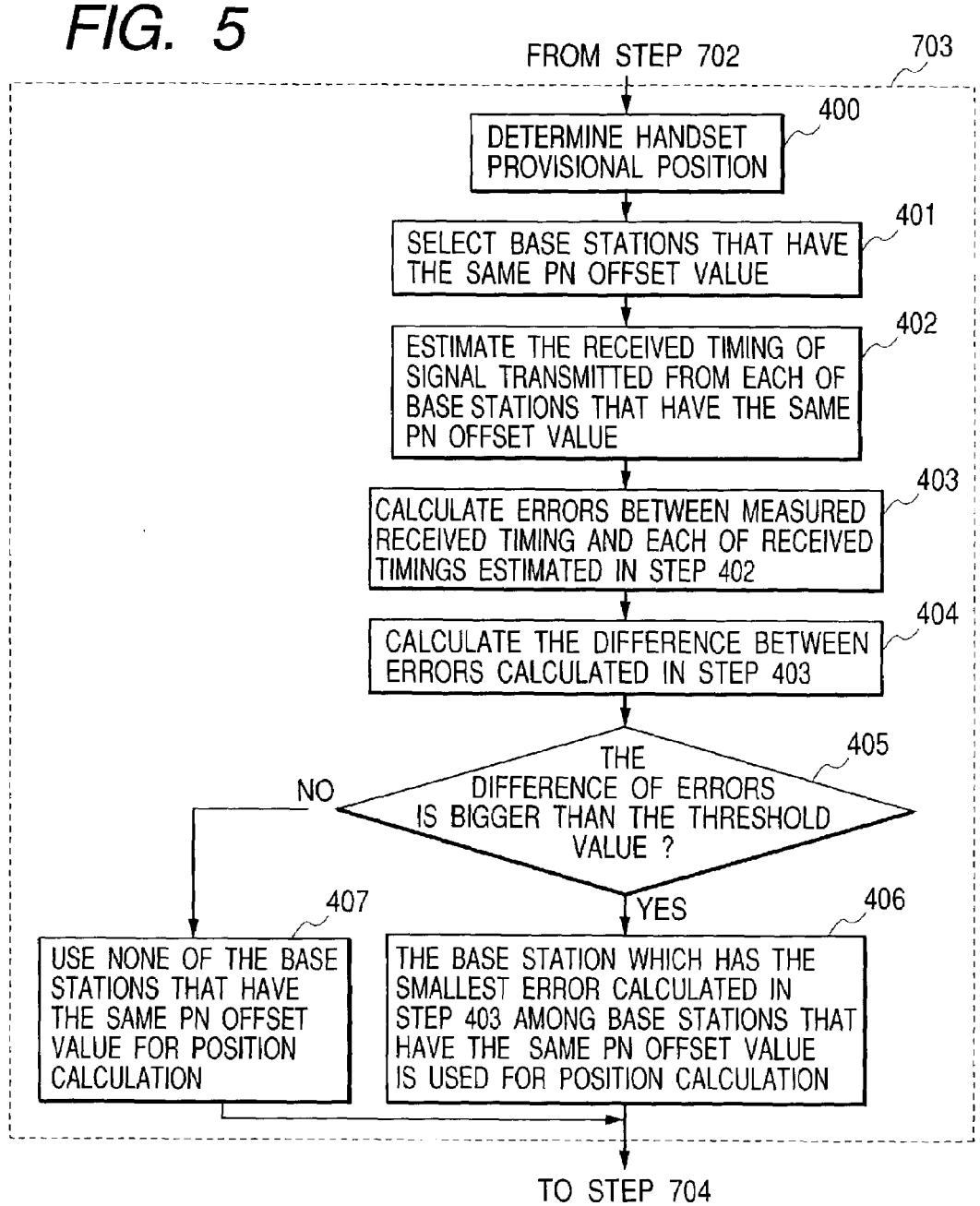

RADIO HANDSET AND POSITION LOCATION SYSTEM

This application is a continuing of U.S. patent application Ser. No. 09/940,548, files 29 Aug. 2001, U.S. Pat. No. 6,484,034, the contents of which are incorporated by reference herein.

BACKGROUND OF THE INVENTION

The present invention relates to a radio handset for detecting its current position using a radio signal and in particular, to a radio handset and a position location system for accurately identifying its current position even when it is difficult to discriminate a base station from which the signal has been transmitted.

In a mobile communication system, there has been suggested a technique to detect a position of a radio handset by using a signal transmitted from a base station. For example, JP-A-7-181242 (laid open on Jul. 21, 1995) discloses a technique for detecting a handset position by using positions of base stations and propagation delay time differences between signals transmitted to a handset from different base stations in a code division multiple access (CDMA) system.

For example, in a radio communication system shown in FIG. 11, a radio handset 800 receives signals from three cellular phone base stations 801, 802, and 803. The radio handset 800 calculates signal propagation time differences, i.e., [propagation time of the signal transmitted from the base station 801—propagation time of the signal transmitted from the base station 802] and [propagation time of the signal transmitted from the base station 801—propagation time of the signal transmitted from the base station 803]. Using the propagation time differences, the radio handset 800 calculates a current position of the radio handset 800.

Here, explanation will be given on a system based on the EIA/TIA-95 specified by the TIA (Telecommunication Industry Association) which is an US CDMA digital moving communication system. In the EIA/TIA-95 system, all the base stations use the same spread code (PN code). Moreover, each of the base stations has a pilot PN offset (PN offset value) as a transmission time difference predetermined for each of the base stations for identification thereof and transmits a signal at a timing shifted from the standard timing by its PN offset value.

A radio handset calculates correlation between the received signal and the PN code so as to obtain a delay profile. For example, a correlation value between the received signal and the PN code is calculated by using a matched filter, the matched filter outputs a delay profile as shown in FIG. 12.

In FIG. 12, 901. 902, and 903 shows correlation values corresponding to signals received from the base stations 801, 802, and 803, respectively. Here, since the base stations have different PN offset values, the correlation values corresponding to the signals from the base stations are temporally separated from one another. Accordingly, in the delay file, it is possible to isolate each of the signals transmitted from the different base stations as well as received timings of the signals from the base stations. Thus, it is possible to detect a location by using the signal propagation time from the base stations.

SUMMARY OF THE INVENTION

However, in a large city where base stations are concentrated, there is a case that base stations having the same PN offset value are located in the proximity to each other. For example, when one and the same PN offset is assigned to the base station 801 and the base station 802, a delay profile waveform as shown in FIG. 13 is obtained as matched filter outputs corresponding to the base stations 801, 802, and 803. That is, since the base stations 801 and 802 have the same PN offset value, correlation values corresponding to the signals received from these base stations are overlapped at the same time as a delay profile waveform (matched filter output).

Thus, when the received signals appear almost at the same time in the delay profile, it is difficult to isolate, according to the base station, a received timing of one signal from another signal. That is, there is a high possibility that this correlation value 910 is incorrectly correlated to a signal from a particular base station. Such a mistake introduces a large error to the propagation time measurement of signals from the respective base station, thereby deteriorating the location accuracy. This means that a user cannot receive an appropriate location information service. That is, benefit of the location information service is diminished.

It is therefore an object of the present invention to provide a radio handset capable of accurately measuring its current position even when it is difficult to isolate respective signals from different base stations.

The radio handset according to an aspect of the present invention includes: signal reception means for receiving signals from a plurality of radio stations; reception timing analysis means for analyzing reception timings of signals received by the signal reception means; radio station selection means for selecting radio stations to be used in a position calculation; and position calculation means for calculating a position of a signal reception point by using the reception timings of the signals from the selected radio stations; wherein the radio station selection means selects the radio stations to be used in the position calculation in such a manner that when reception timings of signals from two or more of the radio stations cannot be separated from one another (for example, when a plurality of radio stations have an identical PN offset value and a delay profile base don the signals from two or more radio stations are overlapped), it is decided to exclude a signal from at least one of these radio stations.

According to another aspect of the present invention, the radio handset includes reception means for receiving signals from a plurality of radio stations, delay profile creation means for creating a delay profile of the signals received by the reception means, and information transmission means for transmitting information used for calculating a position of a reception point using the delay profile, wherein when signals from two or more radio stations cannot be separated from one another in the delay profile (for example, when a plurality of radio stations have an identical PN offset value), the information transmission means transmits information used to exclude at least one of the signals from these radio stations.

According to still another aspect of the present invention, there is provided a position location system including a plurality of radio stations for transmitting signals to a radio handset, reception means for receiving signals from the plurality of radio stations, and a radio handset having delay profile creation means for analyzing a delay profile of signals received by the reception means, wherein position calculation means is built in the radio handset or is provided separately for calculating a position of a reception point by using the delay profile, and wherein the position calculation means calculates the position In such a manner that when signals from two or more of the radio stations cannot be separated from one another in the delay profile (for example, when the plurality of radio stations have the same PN offset value), at least one signal thereof is excluded from the position calculation.

According to yet another aspect of the present invention, there is provided a position calculation apparatus including radio station selection means for selecting radio stations to be used in a position calculation, and position calculation means for calculating a position of a reception point by using reception timings of signals received by a radio handset from a plurality of radio stations, wherein in case reception timings of signals from two or more of the radio stations cannot be separated from one another (for example, when a plurality of radio stations have an identical PN offset value and delay profiles based on the signals from these radio stations are overlapped), the radio station selection means selects radio stations to be used in a position calculation in such a manner that a signal from at least one of these radio station is excluded.

In the radio handset according to the aforementioned aspects of the present invention, in case reception timings of signals from two or more radio stations cannot be separated from one another, radio station selection means excludes a signal from at least one of these radio stations when selecting radio stations to be used in the position calculation. Accordingly, even in an area where radio stations having an identical PN offset value are located in the proximity from each other, it is possible to calculate a current position of the handset with a high accuracy.

BRIEF DESCRIPTION OF THE DRAWINGS

FIG. 5 is a flowchart showing a detailed operation for selecting a base station in a position calculation operation according to a third embodiment.

FIG. 6 shows a relationship between reception timings in the third embodiment.

DETAILED DESCRIPTION OF THE EMBODIMENTS

Description will now be directed to embodiments of the present invention with reference to the attached drawings.

Figure 1:
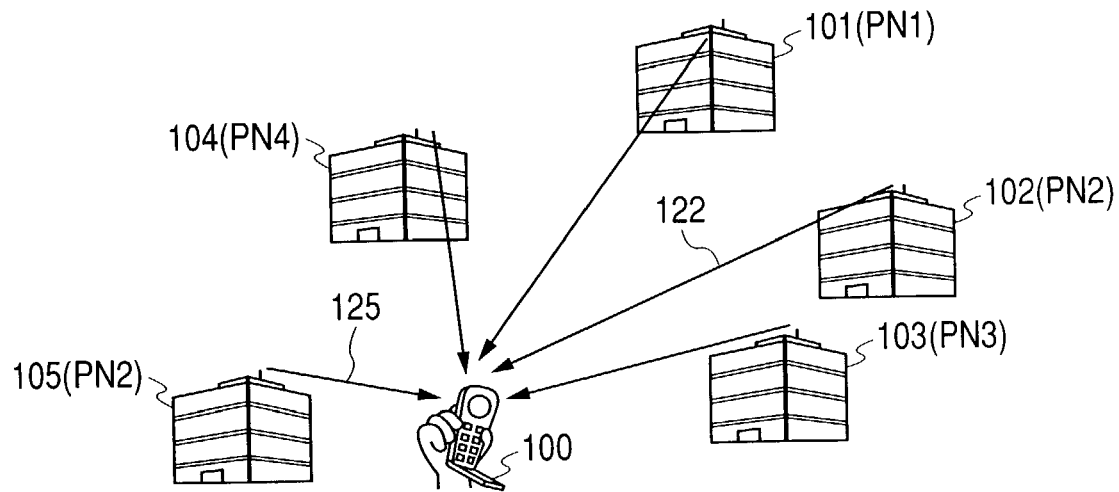
FIG. 1 shows a configuration of a radio communication system according to an embodiment of the present invention.

FIG. 1 shows a radio communication system (mobile communication system) in which a radio handset according to an embodiment of the present invention performs a position measurement.

Around a radio handset 100, such as a cellular telephone, cellular telephone base stations for communication with the radio handset 100 are provided. For base stations 101, 103, and 104, different PN offset values PN1, PN3, and PN4 are assigned. The same offset value PN2 is assigned for the base stations 102 and 105.

In the embodiment of the present invention, the radio handset 100 receives signals transmitted from the base stations 101 to 105. the radio handset 100 measures a propagation distance difference according to the propagation time differences of the signals from at least three base stations and detects a position of the radio handset by trilateration, assuming that positions of the three base stations are known.

Figure 2:
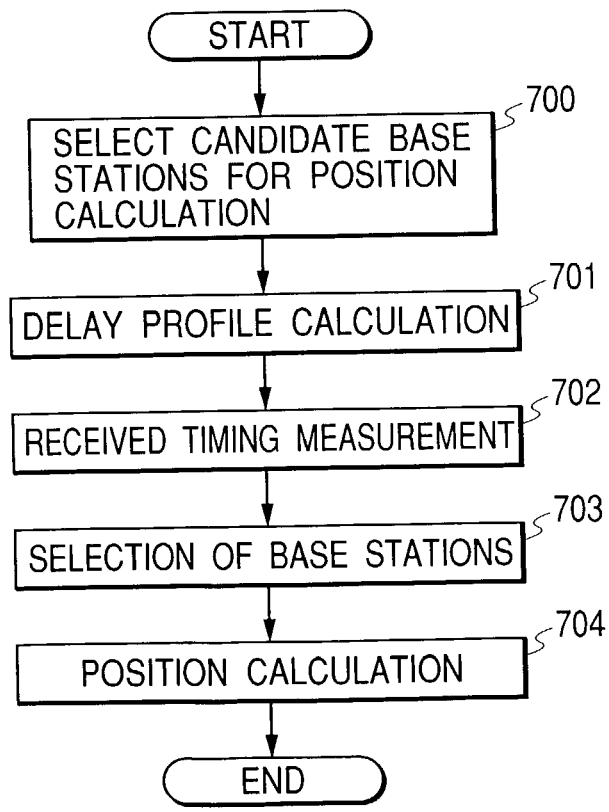
FIG. 2 is a flowchart showing a position calculation operation by the radio handset according to a first embodiment.

FIG. 2 is a flowchart showing a procedure for calculating the position of the radio handset according to the first embodiment of the present invention.

Firstly, the radio handset 100 selects candidate base stations for the position calculation (step 700). For example, the radio handset 100 selects base stations 101 to 105 assumed to be in the vicinity from a base station list stored in advance.

Next, the radio handset 100 calculates correlation values of the signals transmitted from the base stations 101 to 105 with the PN codes and creates a delay profile (step 701). For example, when a correlation value is calculated between a received signal and a PN code using a matched filter, a delay profile waveform is obtained as an output of the matched filter. From the delay profile waveform, the timing having the maximum correlation value is extracted as a reception timing so as to measure reception timings of the signals transmitted from the base stations (step 702).

As for the base stations having the same PN offset, the one to be used for the position calculation is selected so as to prevent deterioration of position measurement accuracy due to an incorrect identification of the base stations (step 703). The method of this selection procedure will be detailed later with reference to FIG. 3.

Next, using the signals of the base stations selected for the position calculation in step 703, the position of the radio handset 100 is calculated (step 704).

Figure 3:
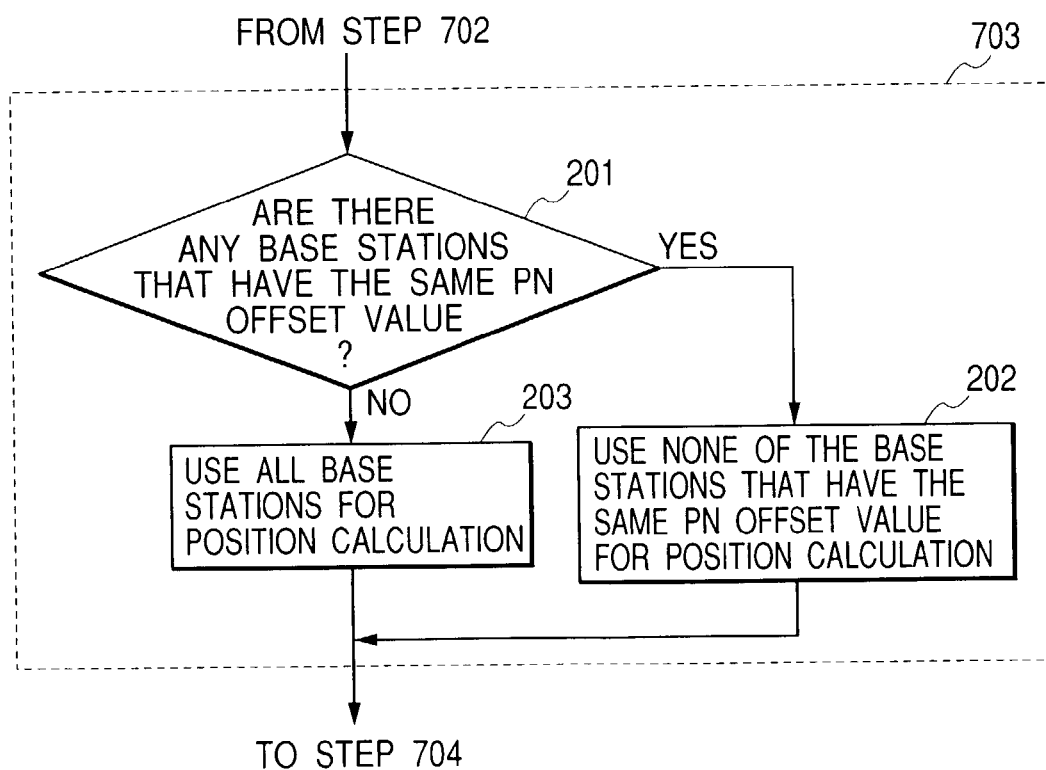
FIG. 3 is a flowchart showing a detailed operation for selecting a base station in the position calculation operation according to the first embodiment.

FIG. 3 is a flowchart showing a detailed procedure of the base station selection in step 703.

The radio handset 100 which measured the reception timings of the signals from the different base stations in step 702 decides whether any two of the base stations have an identical PN offset value (step 201). If no base stations have an identical PN offset (No in step 201), then the signals transmitted from the base stations are not overlapped and it is decides to use all of the candidate base stations selected in step 700 (step 203).

On the other hand, if any two of the base stations have an identical PN offset (Yes in step 201), the signals from the base stations having the identical PN offset value are received as having an overlapped delay profile. Since it is difficult to separate these signals, it is decided not to use the base stations having an identical PN offset (step 202).

As has been described above, in the first embodiment of the present invention, none of the base stations having an identical PN offset value are used for the position calculation. That is, in the radio communication system shown in FIG. 1, the base station 102 and base station 105 are both excluded from the position calculation. Thus, even in a region where base stations having an identical PN offset value are arranged in the proximity from each other, it is possible to prevent deterioration of the position accuracy in the radio handset due to the signals from base stations having the identical PN offset value.

Moreover, even in such an area, it is possible to provide an accurate position information service to a user. This increases the service area of the position information, thereby enhancing the convenience of the position information service.

Figure 4:
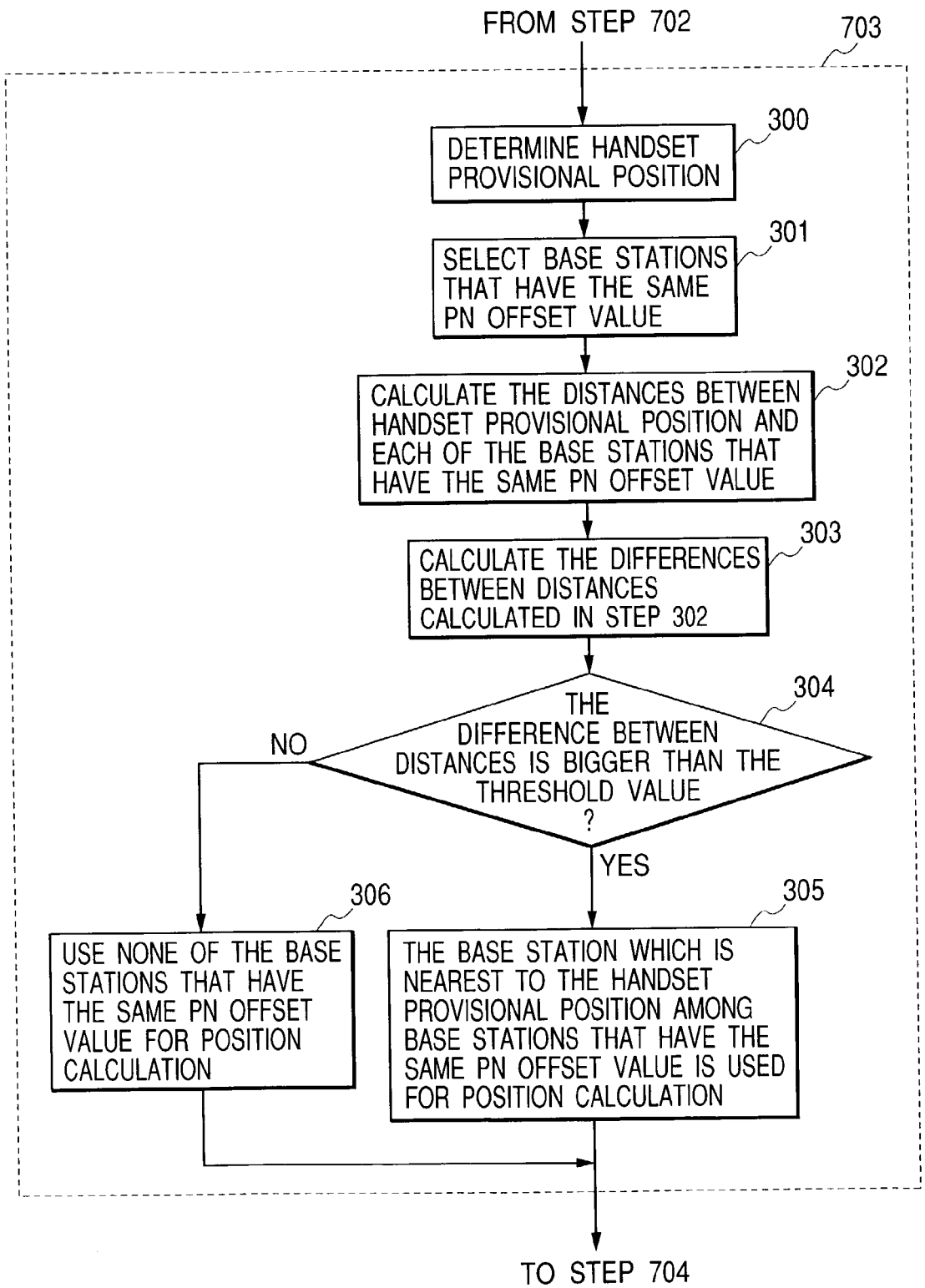
FIG. 4 is a flowchart showing a detailed operation for selecting a base station in a position calculation operation according to a second embodiment.

FIG. 4 is a flowchart showing a detailed procedure of the base station selection involved in the position calculation according to a second embodiment of the present invention.

In the second embodiment shown in FIG. 4, the base station selection operation is different from that (step 703 in FIG. 2) of the first embodiment explained with reference to FIG. 2 and FIG. 3, but maintains some identical operations in FIG. 2.

The radio handset 100 which measured reception timings of the signals from the base stations in step 702, firstly calculates a provisional position of the radio handset 100 (step 300). For example, the provisional position is a position of the base station to which the radio handset 100 has transmitted a position registration signal. Moreover, the provisional position may be the result of calculation using the candidate base stations selected in step 700 (FIG. 2) excluding the base stations having an identical PN offset value.

Among the candidate base stations selected in step 700 (FIG. 2), those base stations having an identical PN off set value are selected. In the radio communication system shown in FIG. 1, the base stations 102 and 105 having the identical PN offset value are selected (step 301).

Next, a distances between the provisional position of the radio handset and the base stations 102 and 105 having the identical PN offset value are calculated, respectively (step 302). That is, the distance 122 between the provisional position of the radio handset 100 and the base station 102 and the distance 125 between the provisional position of the radio handset 100 and the base station 105 are calculated.

Next, a difference between the distances from the provisional position of the radio handset to the base stations having the identical PN offset value is compared to a predetermined value (threshold value) (step 304). According to the comparison result, it is decided whether to involve the base stations having the identical PN offset value in the position calculation.

That is, a difference between the distance 122 and the distance 125 from the provisional position of the radio handset 100 to the base stations 102 and 105 having the identical PN offset value is compared to the predetermined threshold value (step 304). If the difference between the distance 122 and the distance 125 exceeds the threshold value, i.e., if the distance to the base station 102 is not near to the distance to the base station 105 and the signal propagation time values from these base stations are different, then it is possible to isolate each of the signals from these base stations, and the base station nearest to the provisional position of the radio handset 100 is selected so as to be added to the position calculation (step 306).

More specifically, it is decides to use, in the position calculation, not only the base stations 101, 103, and 104 having different PN offset values but also the base station 105 nearest to the provisional position of the radio handset among the base stations 102 and 105 having the identical PN offset value. The reception timings of the signals appearing as overlapped in the delay profile are used in the position calculation, as that of the base station nearest to the provisional position.

On the other hand, when the difference between the distance 122 and the distance 125 is less than the predetermined threshold value, i.e., when the distance to the base station 102 is almost identical to the distance to the base station 105 and the propagation delay time values are almost identical, it is difficult to separate the signals from these stations from each other and the system excludes the base stations having the identical PN offset from the position calculation (step 305). More specifically, neither of the base stations 102 or 105 having the identical PN offset value is used in the position calculation, and only the base stations 101, 103, and 104 having different PN offset values are used in the position calculation.

As has been explained above, in the second embodiment of the present invention, one of the base stations having an identical PN offset value which is estimated to be nearer to the radio handset is selected for use in the position calculation. That is, in the radio communication system shown in FIG. 1, the signal from the base station 105 which is located nearer than the base station 102 is used in the position calculation while excluding the signal from the base station 102 located farther. Accordingly, even in a region where base stations having an identical PN offset value are located in the proximity to each other, it is possible to calculate the position of the radio handset with a high accuracy, thereby providing an accurate position information service to users while enlarging the position information service area and enhancing the benefit of the position information service.

Moreover, when the difference between the distances to the different base stations having an identical PN offset value is small, it is difficult to identify the base station from which the signal has been transmitted and accordingly all the base stations having the identical PN offset value are excluded in the position calculation of a radio handset. This enables to detect the position of the handset more accurately.

FIG. 5 is a flowchart showing a detailed procedure for selecting base stations involved in the position calculation according to a third embodiment of the present invention.

In the third embodiment shown in FIG. 5, the procedure for selecting base stations is different from that (step 703 in FIG. 2) of the first embodiment explained with reference to FIG. 2 and FIG. 3 but maintains some identical processing steps in FIG. 2.

In step 702 the radio handset 100, which has measured reception timings of signals from different base stations, firstly, calculates a provisional position of the radio handset 100 (step 400). For example, this provisional position is calculated, as has been described above, as the position of the base station to which the radio handset 100 has transmitted the position registration signal for the radio communication system, or a result of the position calculation using the candidate base stations selected in step 700 (FIG. 2) excluding those base stations having an identical PN offset value.

Next, the base stations having the identical PN offset value are selected from the candidate base stations selected in step 700 (FIG. 2). In the radio communication system shown in FIG. 1, the base station 102 and the base station 105 having the identical PN offset value are selected (step 401).

Then, estimated values of timings when the signals from the base stations selected in step 401 were received by the radio handset (step 402). The estimated values of the reception timings are calculated using the distances between the provisional position of the radio handset 100 and the base stations 102 and 103 calculated in step 400. That is, each of the distances from the base stations is divided by the propagation velocity (light velocity) to obtain a propagation time so as to calculate the estimated value of the reception timing.

Next, the measured value obtained in step 702 (FIG. 2), i.e., the reception timing of the signals received from the base stations having the identical PN offset value and appearing as overlapped delay profile measured in step 702 (FIG. 2), is compared to the value obtained in step 402, i.e., the estimated value of the reception timing for the base stations having the identical PN offset value, and a difference between these values is calculated as a reception timing error (step 403).

The error, i.e., the difference between the reception timing estimated value and the reception timing measured value calculated for each of the base stations having the identical PN offset value is further processed by calculating a difference between these differences (errors) calculated for the different base stations having the identical PN offset value (step 404). That is, a difference between the reception timing error calculated for the bas station 102 and the reception timing error calculated for the base station 105 is calculated.

Next, the difference between the error calculated for each of the base stations having the identical PN offset value is compared to a predetermined threshold value (step 405). According to this comparison result, it is decided whether to use the base stations having the identical PN offset and subjected to the comparison, in the position calculation.

That is, the difference between the reception timing error for the base station 102 and the reception timing error for the base station 105 with the identical offset value is compared to the predetermined threshold value (step 405). If the difference between the reception timing error for the base station 102 and the reception timing error for the base station 105 exceeds the predetermined threshold value, i.e., when a difference between the distance to the base station 102 and the distance to the base station 105 is not small and the signal propagation time from the base station 102 is different from the signal propagation time from the base station 105, it is possible to isolate the signal of the base station 102 from the signal of the base station 105. In this case, the base station having the smallest reception timing error is selected from the base stations having the identical PN offset value and it is decided to use the this base station having the smallest reception timing error in the position calculation (step 406). Here, the base station giving the smallest reception timing error is selected in the position calculation because the signal received in an overlapped manner has the highest possibility that the signal is from the base station which has transmitted the signal received at the earliest point with the smallest reception timing error.

More specifically, it is decided to perform the position calculation using the base stations 105 having the minimum error between the reception timing estimated value and the reception timing measured value, in addition to the base stations 101, 103, and 104 having different PN offset values. The reception timing of the signals appearing as overlapped in the delay profile is used as the base station having the minimum reception timing error.

On the other hand, when a difference between the reception timing error for the base station 102 and the reception timing error for the base station 105 is smaller than the predetermined threshold value, it is difficult to separate the signals from these stations from each other and the system excludes from the position calculation the base stations having the identical PN offset value (step 407). More specifically, the system does not use in the position calculation either of the base stations 102 and 105 with the identical PN offset value and only the base stations having different PN offset values.

FIG. 6 shows a relationship between signal reception timings when the third embodiment (FIG. 5) is applied to the radio communication system shown in FIG. 1. FIG. 6 shows the reception timing measured values calculated in step 702 and the reception timing estimated values calculated in step 402 (FIG. 5).

In the radio communication system shown in FIG. 1, an identical PN offset value is assigned to the base station 102 and the base station 105. Since a signal from the base station 102 and a signal from the base station 105 have the identical offset value, a delay profile analysis is performed using a matched filter and a reception timing measured value 410 is obtained at a temporally overlapped timing (step 702).

Moreover, using the provisional position of the radio handset 100 and the position of the base station 102, a distance between them is obtained. This distance is divided by light velocity to obtain a propagation delay time, which is used to obtain an estimated value of reception timing of the signal from the base station 102. In the same way, a reception timing estimated value is obtained for the base station 105 having the PN offset value identical to that of the base station 102 (step 402). These reception timing estimated values are indicated by 411 and 412, respectively in FIG. 6.

Differences between the reception timing measured values obtained in step 702 and the corresponding reception timing estimated values obtained in step 402 are calculated as reception timing errors (step 403). The reception timing errors are indicted by 414 and 413 in FIG. 6.

Next, a difference between the reception timing errors, i.e., the error 413 and the error 414, is calculated for the base stations 102 and 105 having the identical PN offset value (step 404).

Next, the difference (error 414—error 413) calculated in step 404 is compared to a predetermined threshold value to decide whether to use in the position calculation, the base station having the smallest reception timing error among the base stations having the identical PN offset value.

As has been described above, in the third embodiment of the present invention, among the base stations having an identical PN offset, a base station having the smallest reception timing error, i.e., for which the estimated value is near to the actual reception timing is selected to be used in the position calculation. That is, in the radio communication system shown in FIG. 1, the signal from the base station 105 having the smallest reception timing error is used in the position calculation, excluding the signal from the base station 102 having a large reception timing error. Accordingly, even when base stations having an identical PN offset value are located in the proximity to each other, it is possible to calculate the position of the radio handset with a high accuracy, thereby enabling to provide an accurate position information service. This enlarges the position information service area, enhancing the benefit of the position information service.

Moreover, if a difference between the reception timing errors of the signals from the base stations with an identical PN offset value is small, it is difficult to identify the base station from which a signal has been transmitted, and the base stations having the identical PN offset value are excluded when calculating the position of the radio handset. This provides a more accurate position of the radio handset.

Figure 7:
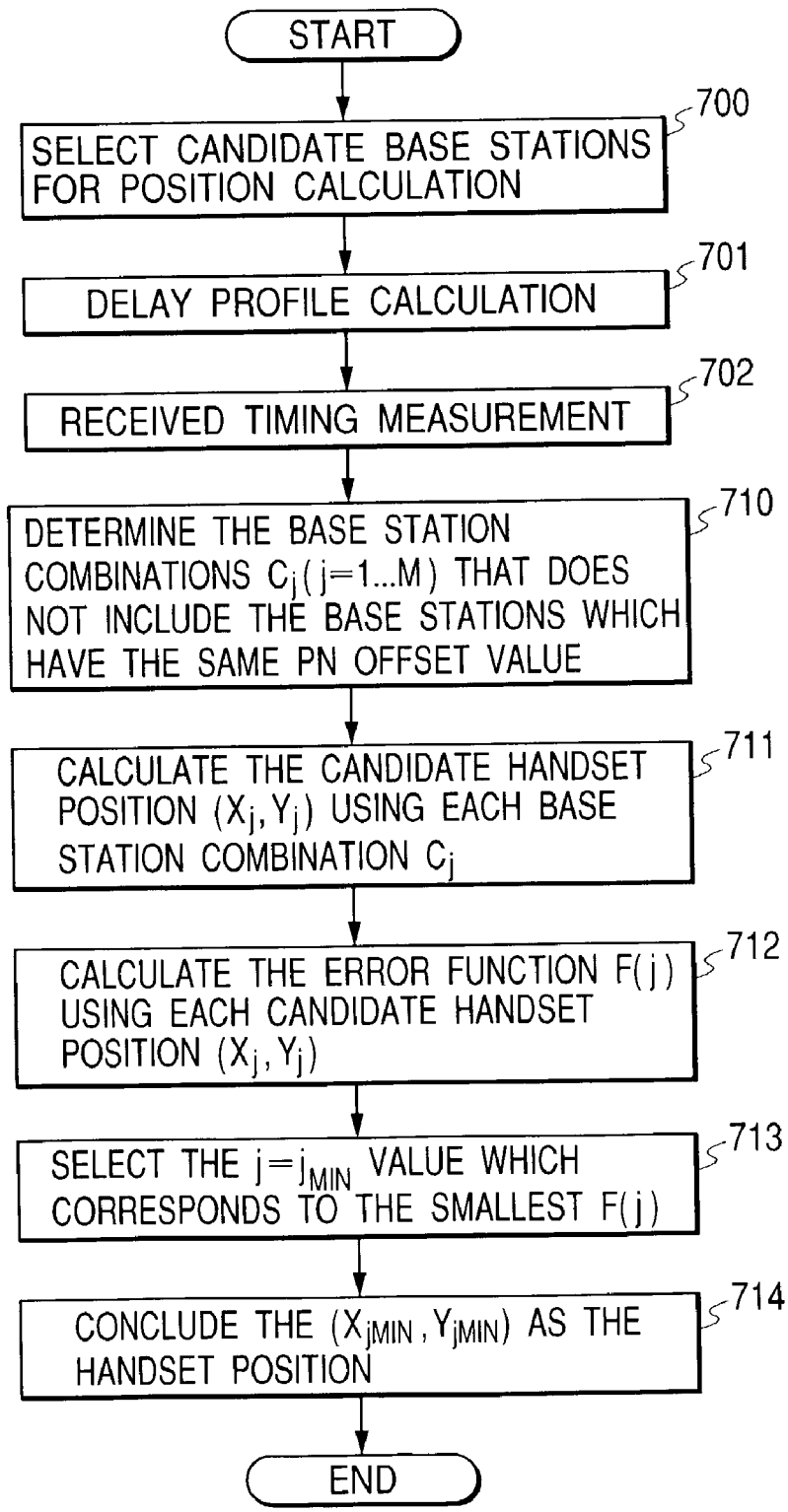
FIG. 7 is a flowchart showing a position calculation operation by a radio handset according to a fourth embodiment.

FIG. 7 is a flowchart indication a procedure for calculating a position of the radio handset according to a fourth embodiment of the present invention.

In the fourth embodiment shown in FIG. 7, the method for selecting base stations to be used in the position calculation (steps 710 to 714) is different from that of the first embodiment explained with reference to FIG. 2 and FIG. 3 but maintains the same processes in steps 700 to 702 shown in FIG. 2.

Firstly, the radio handset 100 selects candidate base stations to be used in the position calculation (step 700). For example, base stations 101 to 105 estimated in the vicinity are selected from a base station list stored in the radio handset 100.

Next, the radio handset 100 calculates correlation values between the signals received from the base stations 101 to 105 with the PN codes so as to create a delay profile (step 701). For example, a matched filter is used to calculate a correlation value between a received signal and a corresponding PN code. Thus, as an output from the matched filter, a delay profile waveform is obtained. According to this delay profile, the earliest timing having the maximum correlation value is extracted as a reception timing, thereby measuring reception timings of signals from the base stations (step 702).

With some of the candidate base stations selected in step 700 to be used in the position calculation, a combination of base stations Cj (j=1, . . . , M) is decided (step 710). This base station combination is decided so as to contain one base station having an identical PN offset value, i.e., only one of the base stations with the identical PN offset value is contained in the combination. More specifically, in the radio communication system shown in FIG. 1, a first combination of base stations consists of the base stations 101, 102, 103, and 104 and a second combination of base stations consists of the base stations 101, 103, 104, and 105. Thus, in step 710, the base station combination is determined in such a manner that only one of the base stations having the identical PN offset value is contained in one combination, i.e., the base stations 102 and 105 having the identical PN offset value cannot be contained in one combination.

By using the base stations combination Cj (j=1, . . . , M) decided in step 710, positions of the respective reception points are calculated to obtain a position calculation result (Xj, Yj) for each of the base station combinations (step 711).

For the position calculation result (Xj, Yj) calculated in step 711, a position measurement error is calculated using an error function value F(j). This position measurement error can be calculated, for example, by using an equation as follows.

Here, in the Equation 1, the first term in the right side within { } is a distance between the radio handset and a base station 0 calculated from coordinates on a map, and the second term in the right side within { } represents a distance between the radio handset and the base station i. Accordingly, the value obtained in { } represents a difference between the distance from the base station 0 (serving as a reference) and a distance from the i-th base station. Moreover, the third term in the right side represents a difference between: a distance between the radio handset and the reference base station 0 obtained from the reception timing measurement result, and a distance between the radio handset and the base station i. When the reception timings are correctly measured, the difference between these two distances approaches to 0. Accordingly, it is possible to decide that as the value of F(i) becomes smaller, more accurate position of the radio handset is obtained.

Then, a jMIN minimizing the value of the error function value F(j) corresponding to the base station combination Cj calculated in step 712 is selected (step 713), and a position calculation result (XjMIN, Y&jMIN) corresponding to the jMIN is selected. This position calculation result is determined to the position of the radio handset. As is clear from the aforementioned, "N" in the aforementioned Equation, is the number of base stations belonging to Cj deleted by 1.

A specific example will be explained by applying this fourth embodiment to the radio communication system shown in FIG. 1. By using the combination of the base stations 101, 102, 103, and 104 and the combination of the base stations 101, 103, 104, and 105, the radio handset position is calculated (step 711) and by using the error function value F(j), the position measurement error is calculated (step 712). Then the radio handset position calculated by using the base station combination having a smaller error function value is decided to be a position calculation result (steps 713 and 714).

As has been described above, in the fourth embodiment of the present invention, a plurality of combinations each containing only one of the base stations having an identical PN offset value are created and the position accuracy of the radio handset is calculated by selecting a base station combination having the smallest position error. That is, the one of the base stations having an identical PN offset value giving a minimum position error is selected for calculating the position of the radio handset. Accordingly, even if the base stations having an identical PN offset value are located in the proximity from each other, it is possible to calculate the position of the radio handset with a high accuracy.

Figure 8:
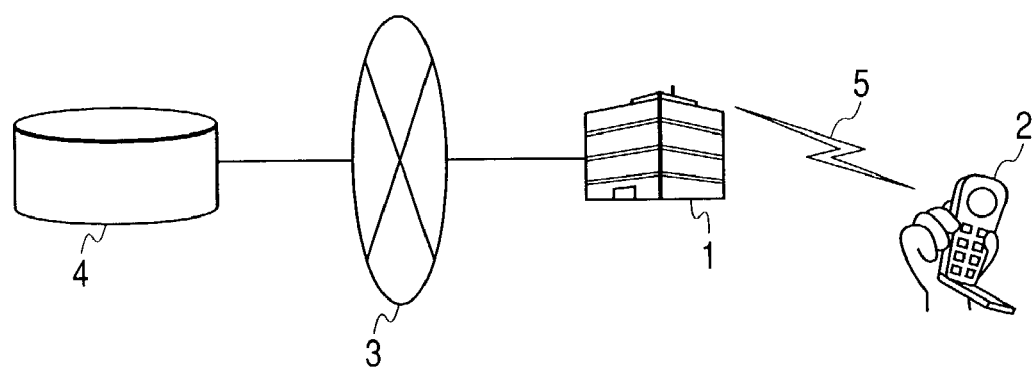
FIG. 8 shows a configuration of a mobile communication system according to an embodiment of the present invention.

FIG. 8 shows a configuration related to the position calculation in the mobile communication system in which the radio handset according to the embodiment of the present invention performs position calculation.

$$F(j) = \frac{1}{N} \sum_{j=1}^{N} \left[ \left\{ \sqrt{(X_j - BX_0)^2 + (Y_j - BY_0)^2} - \sqrt{(X_j - BX_1)^2 + (Y_j - BY_1)^2} \right\} - C(T_0 - T_1) \right]^2 \quad (1)$$

wherein
C . . . light velocity
(Xj, Yj) . . . result of the radio handset position calculation using the base station combination Cj
(BXi, BYi) . . . position of a base station i
Ti . . . result of reception timing measurement of the signal from the base station i The radio handset 2 selects an base station 1 appropriate for communication, from a plurality of base stations, and communicates with the base station 1 via a radio line 5. Moreover, for hand-over or the like, the radio handset 2 receives a signal from a base station other than the base station 1 where the radio line 5 is currently set. By using signals received from the plurality of base stations, the position of the radio handset 2 is measured.

The base station 1 is connected to a public network 3 and serves as communication means between the radio handset 2 and another communication device (not depicted) connected to the public network 3. Moreover, the base station 1 communicates with a position information server 4 connected to the public network 3 and transmits/receives information required for the position calculation.

Figure 9:
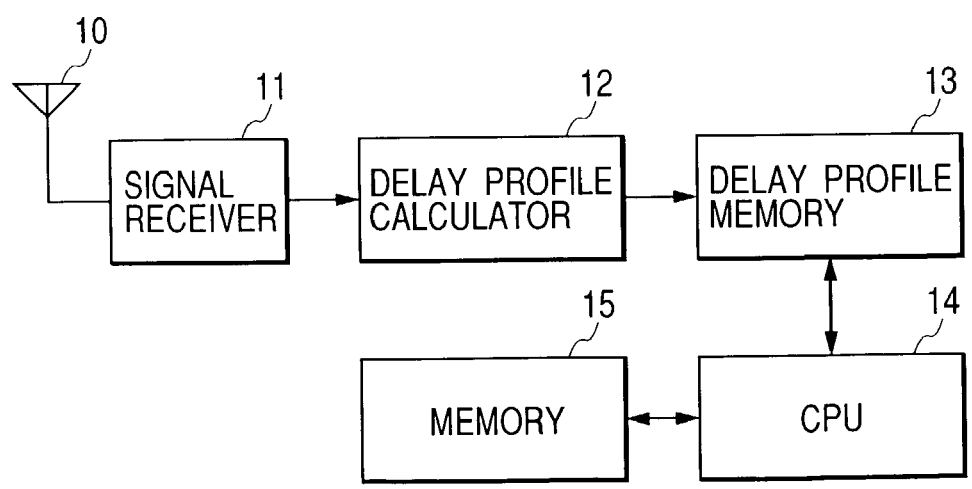
FIG. 9 is a block diagram of a radio handset according to an embodiment of the present invention.

FIG. 9 is a block diagram showing a configuration of the radio handset 2.

A signal from the base station 1 is received by an antenna 10 and transmitted to a signal receiver 11. The signal receiver 11 includes a radio block (receiver/transmitter) and a base-band processing block. The radio block performs amplification of a higher frequency signal and an intermediate frequency signal and a reception of frequency conversion. The base-band processing block performs demodulation of a base-band signal.

The signal processed in the signal receiver 11 is fed to a delay profile calculator 12. The delay profile calculator 12, for example, includes a matched filter and calculates a correlation value between a received signal and a corresponding PN code for each reception timing so as to create a delay profile indicating a value corresponding to a correlation value in each of the reception timings.

The delay profile created in the delay profile calculator 12 is stored and retained in a delay profile memory 13. According to software stored in a storage device 15 (such as a memory), a CPU 14 executes processing required for the position calculation by using the delay profile stored in the delay profile memory 13.

The radio handset 2 may be configured in such a manner that the delay profile calculator 12 and the delay profile memory 13 are arranged as a single semiconductor device (LSI) which is connected to the CPU 14. Moreover, it is possible to constitute a single LSI by the delay profile calculator 12, the delay profile memory 13, and the CPU 14, which is connected to the storage device 15. Furthermore, it is also possible to constitute a single LSI by the delay profile calculator 12, the delay profile memory 13, the CPU 14 and the storage device 15.

Figure 10:
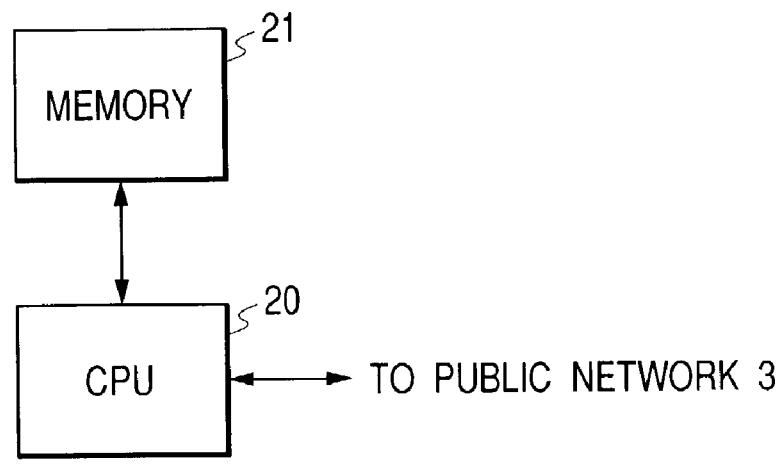
FIG. 10 is a block diagram of a position information server according to an embodiment of the present invention.
Figure 11:
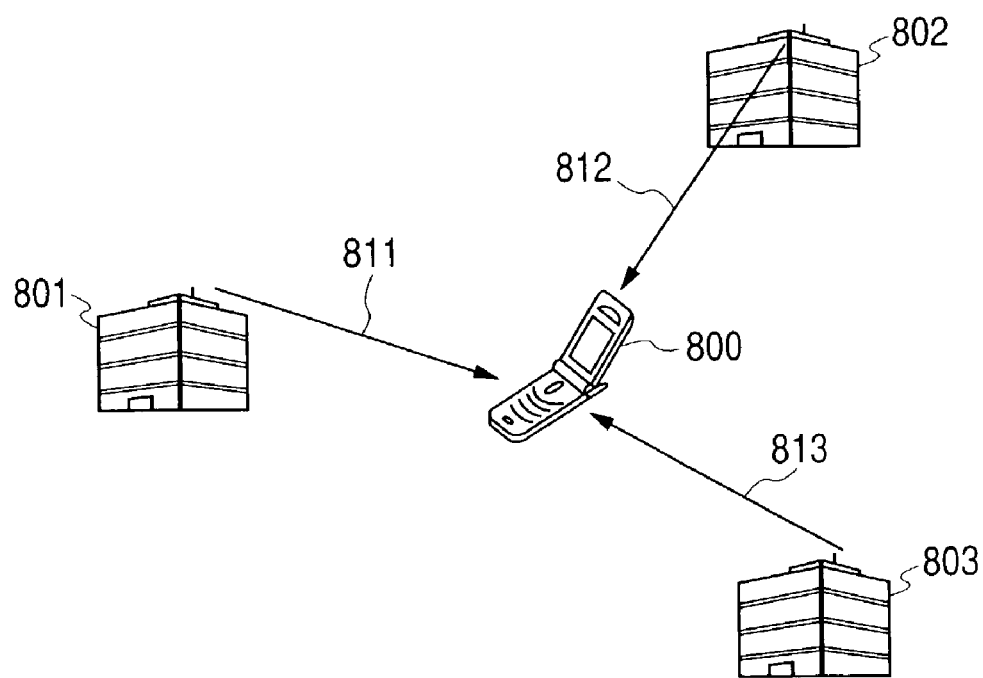
FIG. 11 shows a configuration of a conventional radio communication system.
Figure 12:
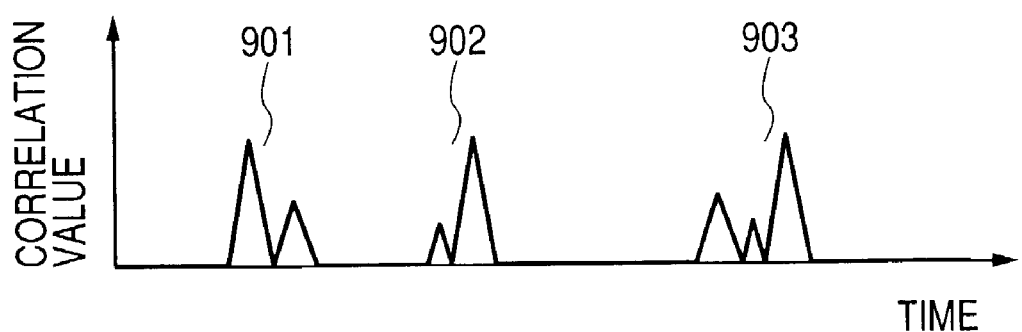
FIG. 12 shows a delay profile in the conventional radio communication system.
Figure 13:
FIG. 13 shows another delay profile in the conventional radio communication system.

FIG. 10 shows a configuration example of the position information server 4. A CPU 20 executes data communication to/from the public network 3 according to software stored in a storage device. More specifically, information related to the base stations (including positions and PN offset values of the base stations) is stored in the position information server 4 and transmitted to the radio handset 2 according to a request from the radio handset 2. Moreover, by using a delay profile based on signals received by the radio handset 2 from base stations, the position of the radio handset 2 is calculated.

Next, explanation will be given regarding how the position calculation shown in FIG. 2 is performed by the radio handset 2.

Firstly, the CPU 14 of the radio handset 2 selects candidate base stations to be used in the position calculation (step 700). The signal receiver 11 receives signals from the candidate base stations, and the delay profile calculator 12 calculates a correlation value between the received signal and the corresponding PN codes to create a delay profile (step 701), which is stored in the delay profile memory 13.

Next, the CPU 14 extracts signal reception timings from the candidate base stations in the delay profile stored in the delay profile memory 13 and measures reception timings of the signals from the base stations (step 702). Then, the CPU 14 decides whether to use in the position calculation those signals transmitted from base stations having an identical PN offset value and selects base stations to be used in the position calculation (step 703), thereby calculating the position of the radio handset 2 (step 704).

The position of the radio handset 2 thus calculated may be used by the CPU 14 (radio handset 2) or reported via the base station 1 and the public network 3 to the position information server 4 where the position information can be used.

Next, explanation will be given when the position calculation processing shown in FIG. 2 is divided into two parts performed by the radio terminal 2 and the position information server 4.

Firstly, the CPU 14 of the radio handset 2 selects candidate base stations for use in the position calculation (step 700). The signal receiver 11 receives signals from the candidate base stations. The delay profile calculator 12 calculates correlation values between the received signals and the corresponding PN codes to create a delay profile (step 701), which is stored in the delay profile memory 13.

After this, the CPU 14 extracts reception timings of the signals from the candidate base stations in the delay profile stored in the delay profile memory 13 and measure the reception timings of the signals from the base stations (step 702). Then, the CPU 14 reports the reception timings of the signals from the base stations obtained in step 702, via the base station 1 and the public network 3 to the position information server 4.

By using the reception timings of the signals from the aforementioned base stations, the CPU 20 in the position information server 4 decides whether to use in the position calculation, the signals from the base stations having an identical PN offset and selects base stations to be used in the position calculation (step 703), after which the CPU 20 calculates the position of the radio handset 2 (step 704). The position of the radio handset 2 obtained in this step 704 may be utilized in the CPU 20 (position information server 4) or may be reported via the public network 3 and the base station 1 to the radio handset 2.

Thus, instead of performing all the steps of the position calculation in the radio handset 2, the position calculation processing is partially performed in the position information server 4 connected to the base station 1. That is, a complicated process can be executed in the position information server 4 having a large computation capacity, and the position of the radio handset 2 can be calculated with a high speed without applying a large processing load to the radio handset 2.

Next, explanation will be given on the processing of the position calculation shown in FIG. 7 is performed.

Firstly, the CPU 14 of the radio set 2 selects candidate base stations to be used in the position calculation (step 700). The signal receiver 111 receives signals from the candidate base stations. The delay profile calculator 12 calculates correlation values between the received signals and corresponding PN codes to create a delay profile (step 701) and stores the profile in the delay profile memory 13.

After this, the CPU 14 extracts reception timings of the candidate base station in the delay profile stored in the delay profile memory 13 and measures reception timings of signals from the base stations (step 702). Then, the CPU 14 decides combinations of base stations to calculate a position of the radio handset 2 (steps 710 to 714). The position of the radio handset 2 obtained in step 714 may be used in the CPU 14 (radio handset 2) or may be reported via the base station 1 and the public network 3 to the position information server 4 so that the position information is utilized later.

Next, explanation will be given on the position calculation processing shown in FIG. 7 divided into two parts to be performed in the radio handset 2 and the position information server 4.

Firstly, the CPU 14 of the radio handset 2 selects candidate base stations to be used in the position calculation (step 700). The signal receiver 11 receives signals from the candidate base stations. The delay profile calculator 12 calculates correlation values between the received signals and corresponding PN codes to create a delay profile (step 701) and stores the profile in the delay profile memory 13.

After this, the CPU 14 extracts reception timings of the signals from the candidate base stations, from the delay profile stored in the delay profile memory 13 and measures reception timings of the signals from the base stations (step 702). Then, the CPU 14 reports the reception timings of the signals from the base stations obtained in step 702, via the base station 1 and the public network 3 to the position information server 4.

The CPU 20 of the position information server 4 uses the reception timings of the signals from the respective base stations for executing the processes for deciding combinations of the base stations up to a process for calculating the position of the radio handset 2 (steps 710 to 714). The position of the radio handset 2 obtained in step 714 may be used in the CPU 14 (radio handset 2) or may be reported to via the base station 1 and the public network 3 to the position information server 4 so that the position information is utilized later.

Thus, instead performing all the steps of the position calculation in the radio handset 2, the position calculation is partially performed in the position information server 4 connected to the base station 1. That is, a complicated process can be performed in the position information server 4 having a large computation capacity. This enables to calculate the position of the radio handset 2 with a high speed without applying a large processing load to the radio handset 2.

The followings are representative aspects of the present invention in addition to those described in claims.

A position location system comprising: a plurality of radio stations for transmitting signals to a radio handset; reception means for receiving signals from the plurality of radio stations; a radio handset having delay profile creation means for analyzing a delay profile of the signals received by the reception means; and position calculation means built in the radio handset or provided separately for calculating a position of a reception point by using the delay profile;

wherein the position calculation means calculates the position in such a manner that when signals from two or more of the radio stations cannot be separated from one another in the delay profile (for example, when these radio stations have an identical PN offset value and signals therefrom cannot be identified in the delay profile), at least one signal thereof is excluded from the position calculation, and the position calculation means performs position calculation without using signals whose reception timings cannot be separated from one another except for the radio station located at the shortest distance from a provisional position.

A position location system comprising: a plurality of radio stations for transmitting signals to a radio handset; reception means for receiving signals from the plurality of radio stations; a radio handset having delay profile creation means for analyzing a delay profile of the signals received by the reception means; and position calculation means built in the radio handset or provided separately for calculating a position of a reception point by using the delay profile;

wherein the position calculation means calculates the position in such a manner that when signals from two or more of the radio stations cannot be separated from one another in the delay profile (for example, when these radio stations have an identical PN offset value and signals therefrom cannot be identified in the delay profile), at least one signal thereof is excluded from the position calculation, and further reception timing error estimation means is provided for estimating reception timing errors of the signals from the radio stations, and the position calculation means performs a position calculation without using signals whose reception timings cannot be separated from one another except for the radio station having the smallest signal reception error (the error in this case is, for example, a difference between a propagation time of the signal from the radio station and a propagation time obtained from the position of the radio station and a provisional position of a reception point).

A position calculation apparatus including radio station selection means for selecting radio stations to be used in a position calculation, and position calculation means for calculating a position of a reception point by using reception timings of signals received by a radio handset from a plurality of radio stations, wherein in case reception timings of signals from two or more of the radio stations cannot be separated from one another (for example, when a plurality of ratio stations have an identical PN offset value and delay profiles based on the signals from these radio stations are overlapped, disabling to separate reception timings of signals from these radio stations), the radio station selection means selects radio stations to be used in a position calculation in such a manner that a signal from at least one of these radio station is excluded, and the radio station selection means selects radio stations to be used in a position calculation in such a manner that the signals whose reception timings cannot be separated from one another are not used in the position calculation except for the radio station located at the shortest distance from the provisional position.

A position calculation apparatus including radio station selection means for selecting radio stations to be used in a position calculation, and position calculation means for calculating a position of a reception point by using reception timings of signals received by a radio handset from a plurality of radio stations, wherein in case reception timings of signals from two or more of the radio stations cannot be separated from one another (for example, when a plurality of ratio stations have an identical PN offset value and delay profiles based on the signals from these radio stations are overlapped, disabling to separate reception timings of signals from these radio stations), the radio station selection means selects radio stations to be used in a position calculation in such a manner that a signal from at least one of these radio station is excluded, and the radio station selection means selects radio stations to be used in a position calculation in such a manner signals whose reception timings cannot be separated from one another are not used in a position calculation except for the radio station having the smallest signal reception error (the error in this case is, for example, a difference between a propagation time of the signal from the radio station and a propagation time obtained from the position of the radio station and a provisional position of a reception point).

A program causing a radio handset to execute a position calculation method which receives signals from a plurality of radio stations and calculates a position of a reception point by using reception timings of the signals, the program causing the radio handset to functions as analysis means for analyzing reception timings of the signals received;

as selection means for selecting radio stations to be used for calculation of the position; and calculation means for calculating the position of the reception point by using the signals from the radio stations selected;

wherein in case reception timings of signals from two or more of the radio stations cannot be separated from one another (for example, when the radio stations have an identical PN offset value and delay profiles based on the signals from the two or more stations are overlapped, disabling to separate reception timings of the signals from these radio stations from one another), the radio stations to be used in calculation of the position are selected in such a manner that at least one of the signals from these radio stations is not used in the calculation.

A semiconductor device for use in a radio handset having a receiver for receiving signals from a plurality of radio stations and calculating a position of a reception point by using the signals received, the semiconductor device including:

reception timing analysis means for analyzing reception timings of the signals received by the receiver;

radio station selection means for selecting radio stations to be used in calculating the position; and position calculation means for calculating the position of the reception point by using reception timings f the signals from the radio station selected, wherein in case reception timings of signals from two or more of the radio stations cannot be separated from one another (for example, when the radio stations have an identical PN offset value and delay profiles based on the signals from these stations are overlapped, the reception timings of the signals from these stations cannot be separated from one another), the radio stations to be used in calculating the position are selected in such a manner that at least one of the signals from these stations is not used.

A radio handset comprising:

reception means for receiving signals from a plurality of radio stations;

delay profile creation means for creating a delay profile of signals received by the reception means; and information transmission means for using the delay profile to receive information required for calculating a position of a reception point;

wherein in case delay profiles based on signals from two or more of the radio stations cannot be separated from one another, the information transmission means transmits information used for excluding at least one of the signals from the radio stations.

A radio handset comprising:

reception means for receiving signals from a plurality of radio stations;

delay profile creation means for creating a delay profile of signals received by the reception means; and information transmission means for using the delay profile to receive information required for calculating a position of a reception point;

wherein in case more than one of the radio stations have an identical PN offset value and signals from these stations cannot be separated from one another in the delay profile, the information transmission means transmits information used for excluding at least one of the signals from these radio stations in a position calculation.

A radio handset comprising:

reception means for receiving signals from a plurality of radio stations;

delay profile creation means for creating a delay profile of signals received by the reception means; and information transmission means for using the delay profile to receive information required for calculating a position of a reception point;

wherein in case delay profiles based on signals from two or more of the radio stations cannot be separated from one another, the information transmission means transmits information used for excluding at least one of the signals from these radio stations, and the information transmission transmits information used for selecting radio stations to be used in a calculation in such a manner that none of the signals which cannot be separated from one another in the delay profile are used.

A radio handset for receiving signals from a plurality of radio stations and causing to calculate a position of a reception point, the handset comprising:

a receiver for receiving signals from the radio stations;

a delay profile calculator for creating a delay profile of signals received by the receiver; and a control unit for creating information used to select radio stations to be used in a position calculation in such a manner that in case signals from two or more of the radio stations cannot be separated from one another in the delay profile, at least one of the signals from these radio stations is excluded from the position calculation.

A position calculation apparatus comprising:

radio station selection means for selecting radio stations to be used in a position calculation; and position calculation means for calculating a position of a reception point by using reception timings of signals from the radio stations selected by the radio station selection means from the signals received by a radio handset, wherein in case reception timings of signals from two or more radio stations cannot be separated from one another, the radio station selection means selects radio stations to be used in a position calculation in such a manner that at least one of the signals from these radio stations is not used.

A position calculation apparatus comprising:

radio station selection means for selecting radio stations to be used in a position calculation; and position calculation means for calculating a position of a reception point by using reception timings of signals from the radio stations selected by the radio station selection means from the signals received by a radio handset, wherein in case two ore more of the radio stations have an identical PN offset value and delay profiles based on the signals from these radio stations are overlapped, disabling to separate reception timings of the signals from these radio stations, the radio stations selection means selects radio stations to be used in a position calculation in such a manner that at least one of the signals from these radio stations is not used in the position calculation.

A position calculation apparatus comprising:

radio station selection means for selecting radio stations to be used in a position calculation; and position calculation means for calculating a position of a reception point by using reception timings of signals from the radio stations selected by the radio station selection means from the signals received by a radio handset, wherein in case reception timings of signals from two or more radio stations cannot be separated from one another, the radio station selection means selects radio stations to be used in a position calculation in such a manner that at least one of the signals from these radio stations is not used, and the radio station selection means selects the radio stations to be used in the position calculation in such manner that none of the signals from radio stations whose reception timings cannot be separated from one another are used in the position calculation.

A position calculation apparatus comprising position calculation means, wherein the position calculation means calculates a position of a reception point by using reception timings of signals received from a plurality of radio stations including radio stations having an identical PN offset value;

calculates a position of a reception point by using signals from radio stations belonging to a first radio station group consisting of a plurality of radio stations having different PN offset values; uses the calculation result to obtain information concerning distances from the reception point to the radio stations belonging to the first radio station group and information concerning distances from the reception point to the radio stations belonging to the first radio station group calculated by using a reception timing analysis result, thereby obtaining an error of the position of the reception point; and the position calculation means further calculates the position of the reception point by using signals from radio stations belonging to a second radio station group consisting of a plurality of radio stations having different PN offset values; uses the calculation result to obtain information concerning distances from the reception point to the radio stations belonging to the second radio station group and information concerning distances from the reception point to the radio stations belonging to the second radio station group calculated by using a reception timing analysis result, thereby obtaining another error of the position of the reception point; and wherein the calculation result of the position of reception point obtained by using the radio station group having a smaller error is decided to be the position of the reception point.

What is claimed is:

1. A radio handset for position calculation, comprising;
a storing means for storing information of a plurality of radio stations;
a signal receiver for receiving signals transmitted from at least a part of said plurality of radio stations;
a delay profile calculator for creating delay profiles for said received signals; and
a CPU for extracting signal receptions timings of said received signals based on said delay profiles,
wherein, if PN offset values corresponding to two or more of said plurality of radio stations are same, said CPU selects radio stations to be used for position calculation by determining not to use at least one of radio stations corresponding to said same PN offset value for position calculation.

2. A radio handset according to claim 1, wherein, if PN offset values corresponding to two or more of said plurality of radio stations are same, said CPU selects radio stations to be used for position calculations by determining not to use all of radio stations corresponding to said same PN offset value for position calculation.

3. A radio handset according to claim 1, further comprising a means for receiving information of plurality of radio stations including PN offset values.

4. A radio handset according to claim 1, wherein said CPU calculates the position of the radio handset using said extracted signal reception timings corresponding to said selected radio stations.

5. A method of position calculation for a radio handset, comprising the steps of storing information of a plurality of radio stations;
receiving signals transmitted from at least a part of said plurality of radio stations;
creating delay profiles for said received signals;
extracting signal reception timings of said received signals from said delay profiles; and
selecting radio stations to be used for position calculation by determining not to use at least one of radio stations having a same PN offset value.

6. A method of position calculation according to claim 5, wherein, in the step of selecting radio stations all of the radio stations having a same PN offset value are determined not to be used for position calculation.

7. A method of position calculation according to claim 5, further comprising a step of receiving information of plurality of radio stations including PN offset values.

8. A method of position calculation according to claim 5, further comprising a step of calculating the position of the radio handset using said extracted signal reception timings corresponding to said selected radio stations.

9. A method for calculating a position of a radio handset in a system comprising a radio handset and a plurality of radio stations, comprising the step of:
in said radio handset, storing information of a plurality of radio stations, and receiving a plurality of signals transmitted from at least a part of said plurality of radio stations;
creating a plurality of delay profiles for said plurality of received signals;
extracting signal reception timings from said plurality of delay profiles:
selecting radio stations to be used for position calculation by determining not to use at least one of a radio station having a PN offset value same as another radio station included in the information stored in said radio handset: and
calculating the position of said radio handset using said extracted signal reception timings corresponding to said selected radio stations.

10. A method for calculating a position of a radio handset according to claim 9, wherein the system further comprises a position information server having stored therein information of a plurality of base stations including PN offset values, and said position information server transmits the information of radio stations to said radio handset via one of said plurality of radio stations.

11. A method for calculating a position of a radio handset according to claim 9, wherein said step of selecting radio stations is performed by said radio handset.

12. A method for calculating a position of a radio handset according to claim 11, wherein said position calculation is performed by said radio handset.

13. A method for calculating a position of a radio handset according to claim 9, wherein the system further comprises a position information server that communicates with said radio handset via one of said plurality of radio stations, said extracted signal reception timings are transmitted to said position information server, and the step of calculating the position of the radio handset is performed by said position information server.

14. A method for calculating a position of a radio handset according to claim 13, wherein said position information server stores information of a plurality of base stations including PN offset values, and said step of selecting radio stations is performed by said position information server.

15. A radio handset for position calculation, comprising;
a storing means for storing information on locations of each of a plurality of radio stations;
a signal receiver for receiving signals transmitted from at least a part of said plurality of radio stations, each of signals from each of the plurality of radio stations having a PN offset value for a location of each of the plurality of radio stations;
a delay profile calculator for creating delay profiles for said received signals in accordance with PN offset values included in each of said received signals; and
a CPU for extracting signal receptions timings of said received signals based on said delay profiles, wherein, if said CPU selects radio stations to be used for position calculation in accordance with signal reception timings extracted by the CPU by determining signals not to be used having an identical PN offset value, and calculates a location of the radio handset without using PN offset values corresponding to radio stations whose PN offset values are identical.

* * * * *